UNITED STATES PATENT OFFICE.

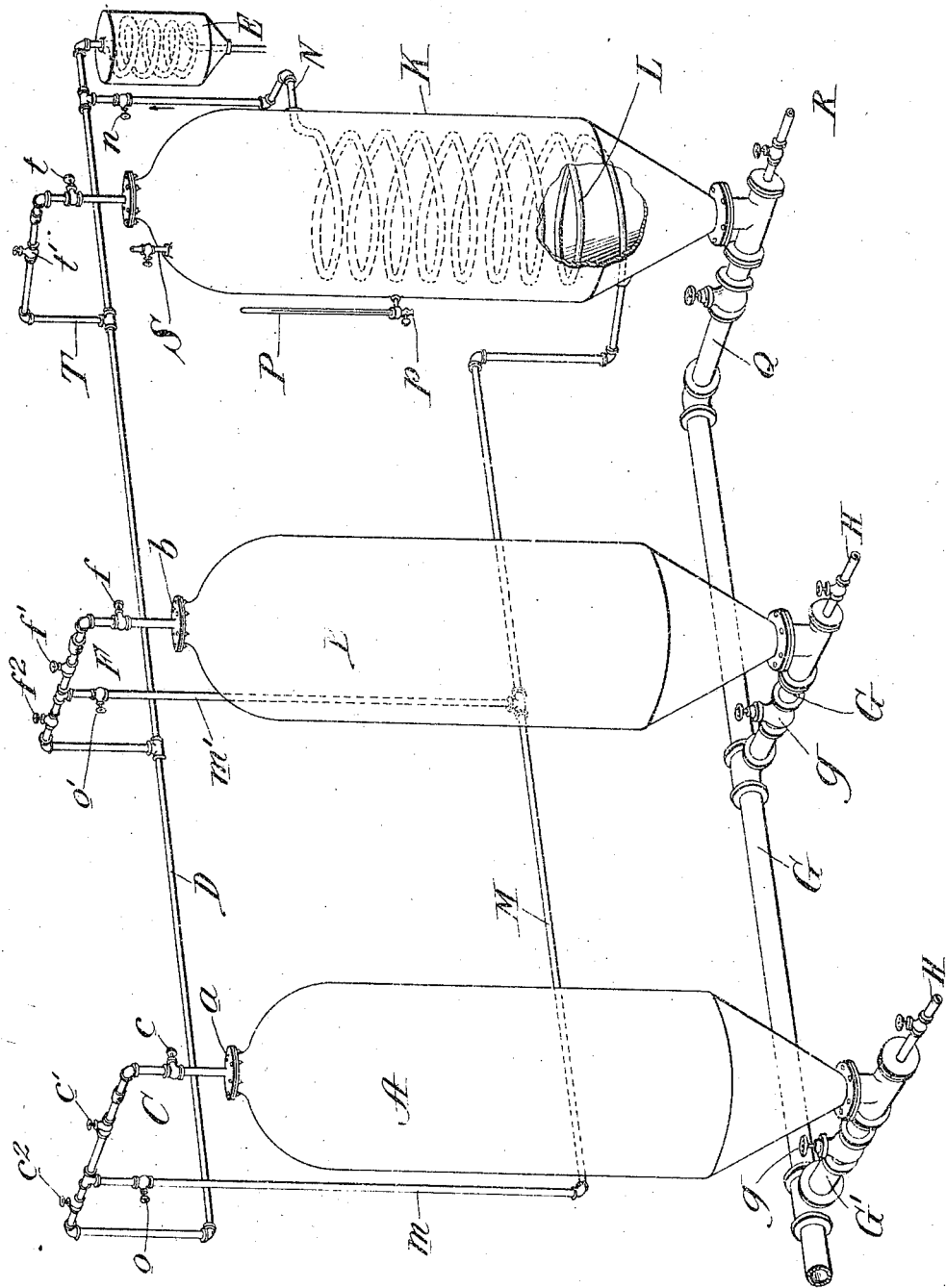

LEMUEL B. DECKER, OF KENOGAMI, QUEBEC, CANADA, ASSIGNOR OF ONE-HALF TO JOHN BALL, OF KENOGAMI, QUEBEC, CANADA.

APPARATUS FOR COOKING WOOD-PULP.

1,167,800.  Specification of Letters Patent.  Patented Jan. 11, 1916.

Application filed February 23, 1915. Serial No. 10,095.

*To all whom it may concern:*

Be it known that I, LEMUEL B. DECKER, a citizen of the United States, residing at present in Kenogami, Province of Quebec, and Dominion of Canada, have invented certain new and useful Improvements in Apparatus for Cooking Wood-Pulp, of which the following is a specification.

This invention relates to the sulfite process of cooking wood pulp in which chips or small pieces of wood are placed in suitable digesters with the proper sulfite liquor and heated under pressure until the cooking operation is completed. Usually the heat and pressure is obtained by injecting steam at the bottom of the digester, the gases and liquor being conveyed from the digesters to a cooling tank and thence to an acid storage tank. The treated pulp is usually discharged through suitable openings and discharge pipes at the bottom of the digesters. This operation is suitable for use on specially prepared chips or small pieces of wood, but is not economical for use on wood in the form of saw-dust, shavings, ground wood screenings, and the like, and the object of my invention is to provide an apparatus which may be operated in the usual way for digesting wood in specially prepared form, and which may also be economically used for digesting or cooking saw-dust, shavings, ground wood screenings and wood waste generally.

In carrying out my invention, I employ one or more digesters of the usual kind and operate them in the usual way for cooking wood in the form of chips and the like. The gases and liquor passing out from the top of the digester or digesters may be conveyed to a cooler and thence to an acid storage tank in the usual way. But I also, instead of conveying the waste gases and liquor directly to the cooling tank, as heretofore, cause such gases and liquor to pass through a heater in the form of a pipe or pipes contained within another digester which receives the waste material of the kind above mentioned. The gases from the ordinary digester or digesters and the liquor escaping therefrom as they pass through the heater in the wood waste digester produce sufficient heat and pressure within said wood waste digester to maintain the cooking operation, sufficient heat being developed and distributed for operating upon the waste material described. The gases and liquor pass from the heating pipes in the wood waste digester to the cooler and thence to the acid storage tank. Other features of the invention and certain details of construction will be hereinafter more fully described.

The accompanying drawings show in perspective and diagrammatically an apparatus for cooking wood pulp, constructed in accordance with my invention.

The digesters A and B are of ordinary construction and may be used in the ordinary way. The digester A has a detachable cover $a$, to which is connected a pipe C, provided with valves $c$, $c'$, $c^2$, said pipe C being in turn connected with a pipe line D, extending to the cooling tank E. In like manner the digester B is provided with a removable cover $b$, connected by a pipe F provided with valves $f$, $f'$, $f^2$ to the pipe line D. Each digester A and B is connected at its bottom with a pulp discharge pipe G by means of a branch pipe G' having a valve $g$ and each digester A and B is also equipped with a valved steam pipe H which supplies the required heat and pressure for cooking purposes. The apparatus thus far described is of usual construction and is operated in the usual way. I, however, employ another digester K which in general is of the usual construction, but which contains a heater preferably in the form of a coil L of lead pipe, one end of which is connected by a pipe line M and branch pipes $m$, $m'$ with the pipes C and F. The opposite end of the coil L is connected by a pipe N with the pipe line D leading to the cooler E. The branch pipes $m$, $m'$ are equipped with valves $o$, $o'$, and the pipe N is provided with a valve $n$. The digester K is provided with a liquor gage P having a test cock $p$, and at its bottom said digester is connected by a pipe Q with the pulp discharge pipe G. R indicates a valved steam inlet pipe which may at times be used.

The apparatus thus described involves a combined direct and indirect method of cooking wood pulp, the direct method being carried on in the digesters A and B to which steam is directly admitted, and the indirect method being carried on in the digester K, which ordinarily does not receive steam but is heated by the heating coil before mentioned. The direct method may be employed to the exclusion of the indirect method or the two may be used simultaneously.

In operation the digesters A and B are partially filled with wood chips and acid in the usual way, and the covers $a$ and $b$ are bolted down. Steam is then admitted through the pipes H and the pressure is raised to about 60 lbs. to the square inch. The valves $c$, $c'$ and $f$, $f'$ are then partially opened to allow air and gas to pass to the cooler. Then after the air and gas have escaped the valves $c$, $c'$, $f$, $f'$ are fully opened while the valves $o$, $o'$ are closed. The liquor, which is at a temperature of about 150° C., enters the pipe line D and passes to the cooler and thence to the acid storage tank. When the cooking is completed, which takes from 8 to 10 hours, the valves $g$ may be opened, and the pulp may pass out through the pipes G'. The apparatus may be used in this way to the exclusion of the digester K, but when it is desired to cook waste wood material of the kind before mentioned the valves $c^2$, $f^2$ are closed, and the valves $o$, $o'$ and $n$ are opened. Before doing this, however, the waste wood is placed in the digester K and acid liquor is pumped into the digester through the valved pipe S. When the liquor has risen to the proper level, as will be indicated by the gage P the valves $o$, $o'$ are opened as before described, or only one valve, say the valve $o$, may be opened in order that gas and liquor of the highest possible temperature may be obtained. In any event the gas and liquor entering the pipe line M pass to and through the coil L and supply and maintain the necessary temperature for cooking purposes, which latter usually takes from 24 to 30 hours. The gas and liquor after passing through the coil L continue on through the pipe N and thence pass to the acid storage tank. The digester K is connected by a pipe T provided with valves $t$, $t'$ with the pipe line D as shown.

It may sometimes be desirable to assist the cooking operation by admitting a relatively small quantity of steam through the pipe R, in which case the air and gas as well as the liquor may pass out to the pipe line D when the valves $t$, $t'$ are opened, and these valves may also be left open when required to permit the passage of air, gas or liquor from the digester K to said pipe line.

It will be seen that in my apparatus I dispense with the use of steam in the wood waste digester, and thus effect a large saving in the cost of manufacture, the heat (say 110° C.) and pressure (50 lbs.) for the wood waste digester being obtained from the waste heat from the main digesters.

It is true that I have shown a steam pipe R for admitting steam to the digester K, but it will be understood that this is not ordinarily used and when used will be for the purpose of supplying a relatively small amount of steam.

It is not possible to economically cook sawdust, ground wood screenings, small coarse slivers and the like in the ordinary digesters, such as A and B owing to the fact that in such digesters the heat is not sufficiently distributed and as such digesters usually contain strainers beneath the covers which become clogged. In the digester K the coil L thoroughly distributes the heat and a complete cooking of the material is effected.

Experience has demonstrated that by my apparatus small chips or small pieces of wood, saw-dust, ground wood screenings and the like can be cooked into sulfite pulp at a saving of four to ten dollars per ton.

I claim as my invention:—

1. An apparatus for cooking wood pulp, comprising a main digester, an acid cooler connected therewith, means for admitting steam to the digester, another or wood waste digester provided with a heater within it connected with the main digester and with the cooler, and means for directing the flow of gas and liquor from the main digester either directly to the cooler or through the heater in the wood waste digester to the cooler.

2. An apparatus for cooking wood pulp, comprising a main digester, an acid cooler, means for admitting steam to said digester, a wood waste digester, a heating coil arranged therein and connected with the main digester and with the cooler, a connection between the interior of the wood waste digester and the cooler, and means for admitting steam to the last named digester.

3. An apparatus for cooking wood pulp, comprising a main digester, an acid cooler, pipe connections between the cooler and said digester, means for admitting steam to the main digester, a wood waste digester, a heating coil within said last named digester, a pipe line connecting said coil with the pipe line connecting the main digester with the cooler, another pipe connecting the coil with said pipe line leading to the cooler, and valves in said pipes and pipe lines for directing the acid liquor and gas from the main digester directly to the cooler or to the cooler through said coil for the purpose specified.

4. An apparatus for cooking wood pulp, comprising a main digester, an acid cooler, means for admitting steam to said digester, a wood waste digester, a heating coil arranged therein for distributing the heat therethrough, connections between the main digester and the heating coil, and a connection between the heating coil and the cooler.

In testimony whereof, I have hereunto subscribed my name.

LEMUEL B. DECKER.

Witnesses:
 WM. CROWLEY,
 W. J. MONAHAN.